UNITED STATES PATENT OFFICE.

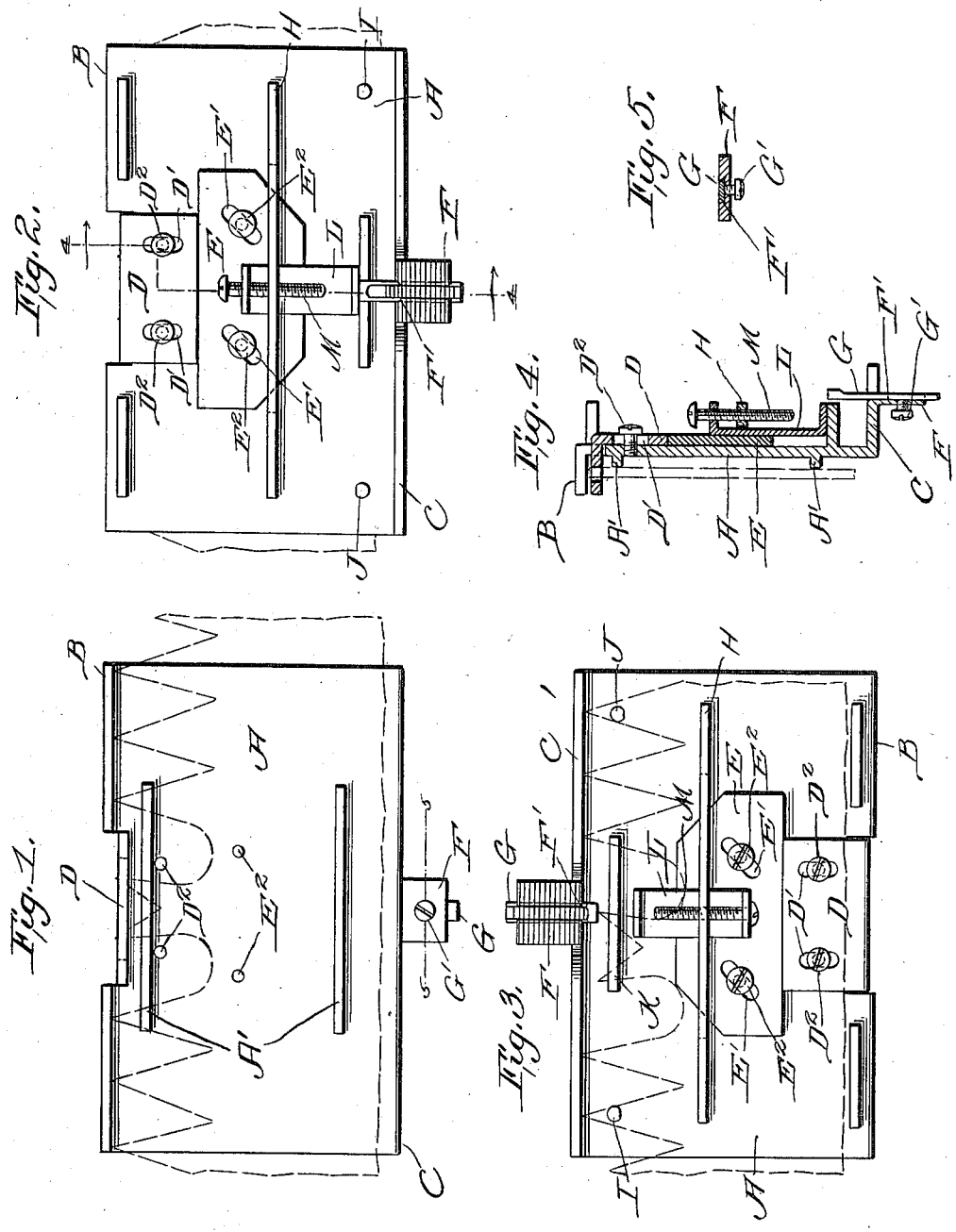

MINOR J. HENDERSON, OF TIADAGHTON, PENNSYLVANIA, ASSIGNOR TO E. C. ATKINS & COMPANY, (INC'P'T'D,) OF INDIANAPOLIS, INDIANA, A CORPORATION OF INDIANA.

CROSSCUT-SAW-FILING TOOL.

1,030,176. Specification of Letters Patent. Patented June 18, 1912.

Application filed August 25, 1910. Serial No. 578,926.

*To all whom it may concern:*

Be it known that I, MINOR J. HENDERSON, a citizen of the United States, residing at Tiadaghton, in the county of Tioga and State of Pennsylvania, have invented a new and useful Improvement in Crosscut-Saw Filing Tools, of which the following is a specification.

This invention relates to a cross cut saw filing tool the object being to provide a tool especially adapted to be used by unexperienced saw filers for gaging the raker teeth and jointing the tops of the cutting teeth of cross cut saws.

Another object of my invention is to provide the tool with an indicating gage for gaging the raker teeth whereby the gage of the teeth can be readily taken so that all of the same can be filed to an even length.

Another object of the invention is to provide very novel means for adjusting the raker gage plate whereby the same can be easily and quickly adjusted and locked in such a manner that all danger of the same moving is prevented.

A still further object of the invention is to provide novel means for holding the saw in such a position that the jointing of the teeth can be readily accomplished.

With these various objects in view, my invention consists of the novel features of construction, combination and arrangement of parts hereinafter fully described, pointed out in the claims and shown in the accompanying drawings, in which—

Figure 1 is a side elevation of my improved tool showing the saw in position to have the raker gage teeth filed. Fig. 2 is a side elevation of the same taken from the opposite side. Fig. 3 is a side elevation of the tool inverted showing a saw in dotted lines in such a position that the depth of the raker teeth can be readily gaged, and, Fig. 4 is a section taken on line 4—4 of Fig. 2. Fig. 5 is a section taken on line 5—5 of Fig. 1.

In carrying out my improved invention, I employ a plate A provided with outwardly projecting flanges B and C at its upper and lower edges which extend outwardly therefrom in opposite directions and the flange B is notched together with the plate A in which works the slotted angled end of a gage plate D which is provided with spaced parallel slots D' through which extend screws $D^2$ working in bores formed in the plate for locking the gage plate in its adjusted position and it will be seen that by loosening the screws the plate is free to move up and down. Arranged under the lower end of the plate D is a plate E which is provided with oblique slots E' through which screws $E^2$ extend so as to slidably mount the plate E on the plate A so that when the same is moved longitudinally the gage plate D will be raised and it will be seen that by this manner by shifting the plate E the raker gage plate D can be readily adjusted by tightening the screws of the respective plates in a rigid position. The plate A is provided with spaced ribs A' against which the side of the saw is adapted to rest when the tool is placed on the same, the cutting teeth resting against the under edge of the flange B and the raker teeth extending up through the slot in the gage plate D so that the same can be readily filed. It will be seen that by this construction the raker gage plate can be readily adjusted and locked in its adjusted position by simply moving the plate E, it of course being understood that the screws are loosened first and tightened after the plates have been adjusted.

In connection with the tool I also provide an indicating gage for gaging the raker teeth so that after they have been filed the tool can be placed on the saw in such a position that each of the raker teeth can be measured so that they will all be cut evenly. For accomplishing this I provide the flange C with slits the intermediate portions being bent upwardly to form a tongue F the face of which is provided with a dove-tail shaped groove F' in which is slidably mounted an indicating gage G which is locked in its adjusted position by a set screw G' working in a bore communicating with the slot formed in the tongue. The face of the indicating gage G is graduated and the face of the tongue to each side of the slot is also graduated so that the gage can be readily set and adjusted to ascertain the length of the raker gage teeth. It is of course understood that when this indicating gage is used the tool is reversed so that the flange C is at the top and extending outwardly from the plate upon this side is a central rib H which is slotted so as to allow the plate E to move freely under the same and against which the side of the saw is adapted to bear, said plate being also provided with lugs I and pins J which also form bearings for the side of the saw where the same will be held in position so that the indicating gage can be readily used upon the teeth. For jointing the saw teeth I provide the plate A with a shoulder K in alinement with the pins J against which the file is adapted to be clamped by a clamping member L which comprises a plate having angled ends which is slidably mounted in the slot formed in the central rib H one end of which is provided with a threaded bore through which extends a screw M which is mounted in a threaded bore formed in the rib H and it will be seen that after the file is placed against the shoulder and pins by tightening up on the screws the angled end of the plate will be brought against the file so as to securely clamp the same in position so that the same can be used for jointing the cutting teeth with the file.

From the foregoing description it will be seen that I have provided a cross cut saw filing tool which is provided with a raker gage, a gage for gaging the raker teeth after they have been filed and a clamping member for holding the file for jointing the teeth.

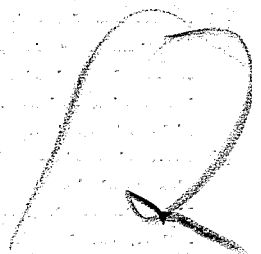

What I claim is:—

1. A saw filing tool comprising a plate provided with an angled flange at one edge having a notch registering with a notch formed in the plate, a slotted angled gage plate slidably mounted on one side of said plate the angled portion extending into said notches, means for locking said plate, a third plate arranged under said raker gage plate provided with oblique slots, screws extending through said oblique slots working in bores formed in the first mentioned plate whereby said raker gage plate can be adjusted by moving said second plate longitudinally with respect to the first mentioned plate.

2. A device of the kind described comprising a plate having a flange along one edge at right angles to the plate, said flange and plate being centrally notched, a raker gage plate having the angled end portion resting in the notch of the flange of the first mentioned plate, said raker gage plate having a vertical movement, and a third plate having an oblique sliding movement upon the first mentioned plate, the raker gage plate resting upon the upper edge of the last mentioned plate, together with means for locking the said last mentioned plate in adjusted position.

MINOR J. HENDERSON.

Witnesses:
JOHN H. HAHN,
L. V. MATHERLY.

---

Copies of this patent may be obtained for five cents each, by addressing the "Commissioner of Patents, Washington, D. C."